April 3, 1962   G. A. FISHER   3,027,987
STEERING RESPONSIVE CONTROL FOR LOCKING DIFFERENTIAL
Filed Sept. 14, 1959

INVENTOR.
George A. Fisher
BY
ATTORNEY

United States Patent Office 3,027,987
Patented Apr. 3, 1962

3,027,987
STEERING RESPONSIVE CONTROL FOR
LOCKING DIFFERENTIAL
George A. Fisher, Mentor Lake, Ohio, assignor to General Motors Corporation, Detroit, Mich., a corporation of Delaware
Filed Sept. 14, 1959, Ser. No. 839,904
12 Claims. (Cl. 192—.098)

The present invention relates to a steering responsive control system for a selectively operable locking differential and, more particularly to such a system particularly adapted for use with heavy duty off-the-road earth-moving vehicles.

To equip heavy duty material handling vehicles such as large capacity off-the-road trucks, scrapers and the like with a conventional differential construction results in serious disadvantages when the vehicle operates in unstable soil, which is the usual case. While the usual differential action is desirable in these vehicles, loss of drive and tractive effort also result as the vehicle traverses soil which is wet or otherwise rendered unstable. Under such circumstances, for example, one drive wheel may at least momentarily lose traction resulting, through the action of the usual differential, in this wheel taking all of the power input and complete loss of traction. Since such conditions frequently occur, and particularly in such vehicles as herein specifically contemplated, special differentials have been used which can be selectively locked to transmit power equally at all selected times to all wheels mounted on the vehicle axle shaft or shafts. In controlling the selective operation of such a lockable differential, it is desirable to relieve the vehicle operator of any requirement to effectuate such a control so that he may concentrate on the operation of the vehicle. To this end, the present invention resides in a steering-responsive control system which will automatically lock and unlock the vehicle differential at proper times during the normal operation of the vehicle.

It is, therefore, a principal object and feature of this invention to provide a control system for selectively operating a lockable differential of a vehicle automatically in response to the steering action of the vehicle.

It is yet another and more specific object and feature of this invention to provide a steering responsive control system for a locking differential whereby the latter is normally locked while the vehicle is being steered in any given direction, but which is selectively unlocked during any change in the course or direction of the vehicle.

In general, these and other objects of this invention are attained in a system comprising power steering motors, such as hydraulic jacks, a fluid pressure-operated clutch of a selectively operable differential and a control or lock value which normally supplies fluid pressure to the clutch pack of the lockable differential to maintain the latter in a locked condition while the vehicle is being steered in any given direction, but which functions automatically in response to a pressure drop in the fluid circuit supplying the steering motor to vent the differential clutch pack to provide normal differential action while the vehicle is being maneuvered to a new direction of steer.

The aforementioned objects and features of this invention will become more apparent hereinafter as the description of the invention proceeds, and in which reference is made to the following drawings in which.

Generally speaking, the inventive system to be described may be practiced in combination with various vehicle steering arrangements and locking differential constructions with which those skilled in the earth-moving art are well acquainted. Therefore, it seems unnecessary to describe in detail a particular type of power steering arrangement and locking differential construction which might be employed in the inventive system, particularly inasmuch as such a description would merely tend to obscure the invention. However, for those who might be interested in further details of a type of earth-moving vehicle with which the present invention may be practiced and a type of power steering arrangement employed therewith, reference may be made to U.S. Patent No. 2,941,612 granted to Ralph J. Bernotas, entitled "High Lift Steerable Excavator," and assigned to the assignee of the present invention. Similarly, an exemplary type of selectively operable locking differential is disclosed in U.S. Patent No. 2,894,416 granted to Robert H. Scott, entitled "Fluid Lock Differential," and assigned to the assignee of the present invention.

Figure 1:
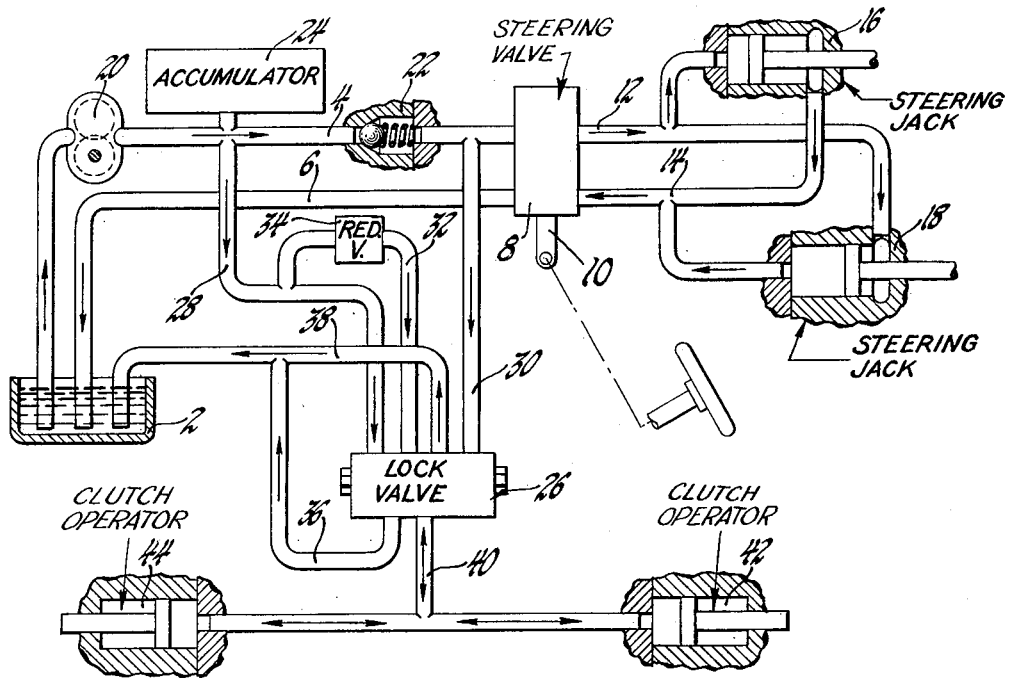
FIGURE 1 is a schematic illustration of the inventive system.

Referring now to FIGURE 1 of the drawing, a preferred embodiment of the inventive control system is shown as comprising a fluid tank or reservoir 2 connected by a steering circuit including the pressure and return lines 4 and 6, respectively, to a steering valve 8 of well known closed center construction. The valve 8 includes a shiftable valve plunger 10 which, in a neutral position, prevents circulation of the fluid through the circuit but, upon shifting the valve plunger, supplies fluid pressure through one of the supply lines 12 and 14 to opposite ends of the double-acting fluid pressure operated steering jacks 16 and 18 while pressure is exhausted from the other ends of the respective jacks through the other supply line and valve 8 back to tank. As indicated schematically to FIGURE 1, the valve plunger 10 is adapted to be selectively shifted in response to operation of a suitable manually operable steering member. It will be readily appreciated by those familiar with heavy-duty earth-moving vehicles such as scrapers or the vehicle disclosed in the aforementioned Bernotas patent that the double-acting steering jacks are adapted to act through a push and pull action to bodily articulate one steering frame member relative to another on the vehicle thereby accomplishing the steering action. A pump 20 is located in the pressure line 4 so as to supply fluid under pressure past a one-way spring loaded ball check valve 22 located anteriorly or upstream of the steering valve 8, while an accumulator 24 of conventional construction is located in the pressure line 4 between the pump and check valve.

The fluid pressure existent at any given moment in the pressure line 4 anteriorly and posteriorly or up and downstream or the check valve 22 is adapted to be communicated with a lock or differential control valve 26 by means of the respective conduits 28 and 30. Additionally, by means of a branch conduit 32 connected to conduit 28 and passing through a reduction valve 34 of conventional construction, upstream pressure is also supplied to the control valve at another location. The branch conduits 36 and 38 communicate the lock valve to the reservoir 2. Another conduit 40 communicates the differential control or lock valve 26 through branch conduits as indicated in FIGURE 1 to the usual fluid pressure-operated motors or operators 42 and 44 associated with the clutch packs of a pair of lockable differentials, one each for the front and rear drive wheels of a four-wheel drive vehicle such as shown in the aforementioned Bernotas patent.

At this juncture, it may be noted that FIGURE 1 of the drawings illustrates an exemplary control system which may be employed with a vehicle of the type disclosed in the aforementioned Bernotas patent and comprising a pair of double-acting steering jacks for bodily articulating one steerable vehicle frame member relative to another, and a lockable differential associated with each of the steerable frame members. However, it will be readily appreciated that the inventive control system may be used with other vehicles in which but one steering motor and one lockable differential is employed.

Figure 2:
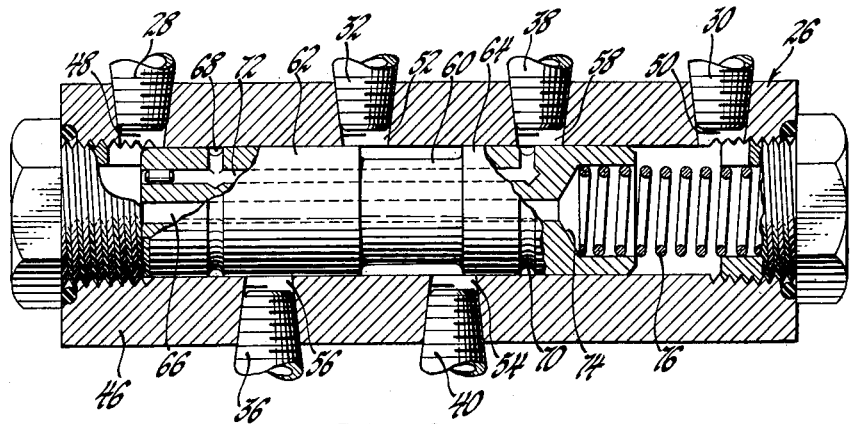
FIGURE 2 is a view, partly in section and partly broken away, illustrating the differential control or lock valve of the system.

Referring now to FIG. 2 of the drawings, the differential control or lock valve 26 may be seen to comprise a cylindrical bored housing 46 having various axially spaced ports therein including a control pressure port 48 connected to the conduit 28 and located at one end of the valve housing, and another control pressure port 50 at the opposite end of the housing connected to the conduit 30. A pressure inlet port 52 is connected to the conduit 32, while a pressure outlet port 54 is connected to the conduit 40 for communication with the differential clutch operators 42 and 44. The exhaust ports 56 and 58 are respectively connected to the reservoir 2 through the conduits 36 and 38.

A cylindrical valve spool 60 is axially shiftably or reciprocably disposed within the bore of the valve housing 46, and includes the axially spaced valve lands 62 and 64 adapted to selectively control communication between the inlet and outlet ports 52 and 54 and the exhaust port 58. A drilled axial passage 66 extending through the valve spool is employed to equalize pressures on opposite ends thereof and to permit relatively free shifting movement of the spool, while the axially spaced annular grooves 68 and 70 communicate with a longitudinally extending drain passage 72 to return to tank any fluid which leaks along the valve spool as will be described. A recessed seat 74 is formed in one end of the valve spool to receive the coiled spring 76, the other end of which abuts an end plug in the end of the valve housing.

By way of preface to a description of the operation of the inventive system, it will be realized, of course, that the differential is advantageously locked while the vehicle is being steered straight ahead or in any other given relatively fixed direction, while it is desirable for differential action to occur in the normal manner while the direction of the vehicle is being changed; i.e., once the vehicle has attained a given direction of steer the differential should be locked, but while this direction is being attained by articulation of the steerable components of the vehicle differential action is desirable for the usual reasons.

While the vehicle is travelling in any given direction, such as straight ahead, it will be readily appreciated that the closed center steering valve 8 is in a neutral position thereby preventing circulation of fluid under pressure through the pressure line 4. At this time, the pressures in line 4 on either side of the check valve 22 are substantially equal and are communicated to the opposite ends of the valve spool 60 through the conduits 28 and 30 and control pressure ports 48 and 50. These pressures substantially balance each other and, therefore, the spring 76 urges the valve spool to its normal locking position as shown in FIGURE 2 of the drawings resulting in communication of the pressure inlet port 52 with the outlet port 54 and closing of the return ports 56 and 58. Consequently, fluid under pressure is communicated through the conduit 32, reduction valve 34 and the control valve to the conduit 40 and the clutch operators 42 and 44 to lock the differentials. Inasmuch as the closed center steering system pressure is in the range of from 800 to 1200 pounds per square inch, the pressure reducing valve 34 is employed to create an approximately 400 pounds per square inch pressure which is all the differential clutch operators require for operation. With the valve spool 60 disposed in the aforementioned normal position, the restricted axial passageway 66 tends to balance the control pressures on opposite ends of the valve spool while the grooves 68 and 70 and longitudinal drain passage 72 allow fluid leaking past the spool to return through the port 58 to tank.

Assuming now that the steering valve 8 is actuated by moving plunger 10 to an open position to supply fluid under pressure through the conduit 12 to opposite ends of the steering jacks 16 and 18 while exhausting fluid from the other ends of these jacks through the line 14 to tank, it will be readily appreciated that a pressure drop occurs across the check valve 22. Moreover, this pressure drop is relatively great since the check valve is loaded to open at a pressure much higher than normally used in such a steering system. As a result, the control pressure communicated through the conduit 30 and control port 50 decreases relative to the control pressure at the opposite end of the valve, this unbalanced condition resulting in collapse of the spring 76 and shifting of the valve spool to the right. In so shifting, the valve spool land 62 blocks further flow of fluid from the pressure inlet port 52 to the outlet port 54, the latter then being placed in communication with the return port 58 thereby venting the clutch operators. As a result, the lockable differentials are immediately released in response to the steering action. With the valve in its shifted position, fluid leaking past the valve spool may return to the reservoir through the drain passage 72 and groove 68 which now overlies return port 56.

The steering valve 8 is continued to be operated until such time as the vehicle has been articulated into a new direction of steer at which time the valve plunger is returned to its normal position blocking further flow through the steering circuit. For example, the vehicle may now be steering to the right on a given radius. At this time, the pressures on either side of the check valve 22 are again substantially equal thereby again balancing the fluid forces acting on the valve spool. Consequently, the spring 76 moves the valve spool back to the position shown in FIGURE 2 thereby resulting in application of the clutch operators to lock the differential. Thus, the steering responsive control system of this invention acts automatically in response to a pressure drop in the steering circuit to apply signal or control pressures to the differential control valve to shift the latter automatically to unlock the differential during steering action, while automatically returning the control valve to a locked position after a given steered direction is attained.

While but one form of the invention has been selected for an illustration thereof, other forms will be apparent to those skilled in the art. Therefore, the embodiment shown in the drawing is merely for illustrative purposes, and is not intended to limit the scope of the invention which is defined by the claims which follow.

I claim:

1. A steering responsive control system for a fluid pressure-operated clutch operator of a lockable differential comprising a source of fluid pressure, a fluid pressure-operated steering jack, a fluid circuit communicating said source with said jack, a steering valve in said circuit selectively controlling operation of said jack, a control valve controlling communication between a pressure inlet port connected to said source, a pressure outlet port connected to said clutch operator and an exhaust port, said control valve having a first position communicating said inlet and outlet ports and a second position communicating said outlet and exhaust ports, and means responsive to the operating condition of said jack for disposing said control valve in a selected one of said positions.

2. A steering responsive control system for a fluid pressure-operated clutch operator of a lockable differential comprising a source of fluid pressure, a fluid pressure-operated steering jack, a fluid circuit communicating said source with said jack, a steering valve in said circuit selectively controlling operation of said jack, a control valve controlling communication between a pressure inlet port connected to said source, a pressure outlet port connected to said clutch operator and an exhaust port, said control valve having a first position communicating said inlet and outlet ports and a second position communicating said outlet and exhaust ports, and means responsive to the pressure in said circuit and acting on said valve to dispose the latter in said first position while said jack is inoperable and in said second position in response to a pressure drop in said circuit upon operation of said jack.

3. A steering responsive control system for a fluid pressure-operated clutch operator of a lockable differential comprising a source of fluid pressure, a fluid pressure-operated steering jack, a fluid circuit communicating said source with said jack, a steering valve in said circuit selectively controlling operation of said jack, a control valve controlling communication between a pressure inlet port connected to said source, a pressure outlet port connected to said clutch operator and an exhaust port, said control valve having a first position communicating said inlet and outlet ports and a second position communicating said outlet and exhaust ports, and conduit means connecting said control valve to said circuit to impose opposing control pressures on said control valve to dispose the latter in said first position while said jack is inoperable, said control valve being moved to said second position in response to a pressure drop in said circuit upon operation of said jack.

4. A steering responsive control system for a fluid pressure-operated clutch operator of a lockable differential comprising a source of fluid pressure, a fluid pressure-operated steering jack, a fluid circuit communicating said source with said jack, a steering valve in said circuit selectively controlling operation of said jack, a control valve including a movable valve member controlling communication between a pressure inlet port connected to said source, a pressure outlet port connected to said clutch operator and an exhaust port, and control means controlling the position of said valve member and including means communicating said fluid circuit to said control valve to impose opposing control pressures on said movable valve member in response to flow conditions in said circuit, said control means disposing said valve member in a position communicating said inlet and outlet ports with said steering valve closed to prevent flow through said circuit, and in a position communicating said outlet and exhaust ports in response to a pressure drop in said steering circuit upon operation of said steering valve.

5. A steering responsive control system for a fluid pressure-operated clutch operator of a lockable differential comprising a source of fluid pressure, a fluid pressure-operated steering jack, a fluid circuit communicating said source with said jack, a steering valve in said circuit selectively controlling operation of said jack, a control valve including a movable valve member controlling communication between a pressure inlet port connected to said source, a pressure outlet port connected to said clutch operator and an exhaust port, and control means controlling the position of said valve member and including individual conduit means connecting spaced portions of said fluid circuit to said control valve to impose opposing control pressures on said movable valve member, said control means disposing said valve member in a position communicating said inlet and outlet ports with said steering valve closed, and in a position communicating said outlet and exhaust ports in response to a pressure drop in said steering circuit upon operation of said steering valve.

6. A steering responsive control system for a fluid pressure-operated clutch operator of a lockable differential comprising a source of fluid pressure, a fluid pressure-operated steering jack, a steering circuit communicating said source with said jack, a steering valve in said circuit selectively controlling operation of said jack, a control valve including a movable valve member controlling communication between a pressure inlet port connected to said source, a pressure outlet port connected to said clutch operator and an exhaust port, and control means controlling the position of said valve member and including conduit means connecting said fluid circuit to said control valve to impose opposing control pressures on said movable valve member, said control pressures being substantially equal with said steering valve in a closed position and said control means disposing said valve member in a position communicating said inlet and outlet ports and closing said exhaust port, and said control pressures being unequal in response to a pressure drop in said fluid circuit upon operation of said steering valve and said control means disposing said valve member in a position connecting said outlet port to said exhaust port and closing said inlet port.

7. A steering responsive control system for a fluid pressure-operated clutch operator of a lockable differential comprising a source of fluid pressure, a fluid pressure-operated steering jack, a fluid circuit communicating said source with said jack, a steering valve in said circuit selectively controlling operation of said jack, a control valve including a movable valve member controlling communication between a pressure inlet port connected to said source, a pressure outlet port connected to said clutch operator and an exhaust port, and control means controlling the position of said valve member and including means connecting said fluid circuit to said control valve to impose opposing control pressures on said movable valve member, said control pressures being substantially balanced with said steering valve in a closed position and said control means disposing said valve member in a position communicating said inlet and outlet ports, and said control pressures being unbalanced in response to a pressure drop in said fluid circuit upon operation of said steering valve and said control means disposing said valve member in a position connecting said outlet port to said exhaust port.

8. A steering responsive control system for a fluid pressure-operated clutch operator of a lockable differential comprising a source of fluid pressure, a fluid pressure-operated steering jack, a fluid circuit communicating said source with said jack, a steering valve in said circuit selectively controlling operation of said jack, a control valve including a movable valve member controlling communication between a pressure inlet port connected to said source, a pressure outlet port connected to said clutch operator and an exhaust port, individual conduit means connecting spaced portions of said fluid circuit to said valve to impose opposing control pressures on said movable valve member, and spring means acting on said movable valve member and normally urging the latter to a position communicating said inlet and outlet ports and closing said exhaust port, said spring means being yieldable in response to a pressure drop in said fluid circuit upon operation of said steering valve to communicate said outlet and exhaust ports and close said inlet port.

9. A steering responsive control system for a fluid pressure-operated clutch operator of a lockable differential comprising a source of fluid pressure, a fluid pressure-operated steering jack, fluid circuit communicating said source with said jack, a steering valve in said circuit selectively controlling operation of said jack, a check valve in said circuit, a control valve including a movable valve member controlling communication between a pressure inlet port in said valve connected to said source, a pressure outlet port in said valve connected to said clutch operator and an exhaust port in said valve, conduit means connecting the pressure in said fluid circuit on each side of said check valve into opposing relationship on said movable valve member to normally dispose the latter in a position communicating said inlet and outlet ports, and in another position communicating said outlet and exhaust ports in response to the pressure drop across said check valve upon actuation of said steering valve.

10. A steering responsive control system for a fluid pressure-operated clutch operator of a lockable differential comprising a source of fluid pressure, a fluid pressure-operated steering jack, fluid circuit communicating said source with said jack, a steering valve in said circuit selectively controlling operation of said jack, a check valve in said circuit, a control valve including a housing, said housing including a pressure inlet port communicating with said source, a pressure outlet port communicating with said clutch operator and an exhaust port, a valve spool movably mounted within said housing, spring means at one end of said spool normally urging the latter to a position communicating said inlet and outlet ports and closing said exhaust port, and conduit means communicating the pressure in said steering circuit on each side of said check valve to the respective ends of said valve spool whereby, upon actuation of said steering valve, the pressure drop across said check valve unbalances the pressures acting on said spool, overcomes said spring and shifts said spool to communicate said outlet and exhaust ports and close said inlet port.

11. A steering responsive control system for a fluid pressure-operated clutch operator of a lockable differential comprising a source of fluid pressure, a fluid pressure-operated steering jack, a fluid circuit communicating said source with said jack, a closed center steering valve in said circuit selectively controlling operation of said jack, a control valve including a housing having a pressure inlet port connected to said source, a pressure outlet port connected to said clutch operator and an exhaust port, an axially shiftable valve spool mounted within said housing and controlling communication between said ports, said valve spool having a first position communicating said inlet and outlet ports and closing said exhaust port and a second position communicating said outlet and exhaust ports and closing said inlet port, yieldable means acting on one end of said valve spool to urge the latter to said first position, and conduit means connecting the respective ends of said valve spool to said fluid circuit to impose opposing control pressures on the ends of said valve spool, said valve spool being shiftable to said second position in response to a pressure drop in said fluid circuit upon operation of said steering valve.

12. A steering responsive control system for a fluid pressure-operated clutch operator of a lockable differential comprising a source of fluid pressure, a double-acting fluid pressure-operated steering jack, a fluid circuit communicating said source with said jack, a closed center steering valve in said circuit selectively controlling operation of said jack, a check valve in said circuit, a control valve including a housing having a pressure inlet port connected to said source, a pressure outlet port connected to said clutch operator and an exhaust port, an axially shiftable valve spool mounted within said housing and controlling communication between said ports, said valve spool having a first position communicating said inlet and outlet ports and closing said exhaust port and a second position communicating said outlet and exhaust ports and closing said inlet port, yieldable means acting on one end of said valve spool to urge the latter to said first position, and conduit means connecting the respective ends of said valve spool to said fluid circuit on each side of said check valve to impose opposing control pressures on the ends of said valve pool, said valve spool being shiftable to said second position in response to a pressure drop in said fluid circuit upon operation of said steering valve.

References Cited in the file of this patent
UNITED STATES PATENTS

| | | |
|---|---|---|
| 2,614,644 | Gustafson | Oct. 21, 1952 |
| 2,894,416 | Scott | July 14, 1959 |
| 2,920,496 | Forster | Jan. 12, 1960 |
| 2,941,612 | Bernotas | June 21, 1960 |